3,301,747
FUNGICIDAL COMPOSITION CONTAINING BLAS-
TICIDIN S AND METAL SALTS OF 1,2-PROPYL-
ENE-BIS-DITHIOCARBAMATE
Hans Scheinpflug, Leverkusen, and Ferdinand Grewe, Burscheid, Bezirk Dusseldorf, Germany, and Herbert Ferdinand Jung, Tokyo, Japan, assignors to Farbenfabriken Bayer Aktiengesellschaft, Leverkusen, Germany, a corporation of Germany
No Drawing. Filed Nov. 3, 1964, Ser. No 408,655
Claims priority, application Germany, Nov. 13, 1963,
F 41,266
3 Claims. (Cl. 167—22)

The present invention concerns a novel combination of active agents, which consists of the known antibiotic Blasticidin S, known salts of 1,2-propylene-bis-dithiocarbamic acid and, optionally, known fungicidal organic mercury compounds and which exhibits a particularly high fungicidal activity.

It has already been disclosed that Blasticidin S can be employed for the control of diseases on rice. This antibiotic however suffers from the disadvantage that its protective activity becomes ineffective a few days after application. In addition, the antibiotic is technically difficult to prepare.

It is known that the salts of 1,2-propylene-bis-dithiocarbamic acid have fungicidal properties. Nothing has hitherto been reported, however, concerning the behavior of these salts during their application against fungus diseases in rice cultivation.

It would be expected that these active agents would not offer any practical interst for the control of rice diseases because fungicidal salts of ethylene-bis-dithiocarbamic acid have proved to be largely ineffective.

It is also known to apply fungicidal organic mercury compounds for the control of rice diseases. Their high toxicity towards warm-blooded creatures and their partial phytotoxicity, however, constitute serious disadvantages.

It is an object of the present invention to provide novel synergistic combinations of active agents which possess fungicidal properties and which are particularly suitable for the control of rice diseases. A further object consists in the determination of those fungicidal agents which only exhibit a low toxicity towards mammals. Other objects are evident from the following description and from the example.

It has been found that novel combinations of active agents from (1) Blasticidin S, (2) salts of 1,2-propylene-bis-dithiocarbamic acid and, optionally, (3) fungicidal organic mercury compounds are particularly suitable for the control of fungus diseases in rice cultivation.

The fact that during the application of the combinations of active agents according to the invention their curative activity does not decrease although their protective effect increases considerably when a part of the Blasticidin is replaced by salts of 1,2-propylene-bis-dithiocarbamic acid must be regarded as definitely surprising. This improvement in activity can also still be observed when the dosage of the individual components in the mixture is reduced by at least half compared with an application of the components on their own. The combinations of active agents exhibit various advantages. Thus, they exhibit an increased compatibility with plants and a wider spectrum of activity. The mixtures according to the invention are clearly superior to previously known products which have been employed for the control of Piricularia oryzae. Blasticidin S is a known antibiotic.

The term "salts" of 1,2-propylene-bis-dithiocarbamic acid" refers to the known fungicidal salts. These particularly include the zinc, manganese and nickel salt. It is also possible to employ mixed salts. Thus, the zinc-manganese mixed salt has proved to be particularly suitable. The mixture preferably contains between 20 and 80% of zinc-bis-dithiocarbamate.

The term "fungicidal organic mercury compounds" refers to the known organic mercury compounds which are applied for the control of fungus diseases, particularly in rice cultivation. They include the alkyl and aryl mercuric salts of organic and inorganic acids. Phenyl mercuric acetate, phenyl mercuric iodide and phenyl mercuric chloride are particularly important.

The combinations of active agents according to the invention contain 20–99% preferably 80–98% of the 1,2-propylene-bis-dithiocarbamates in the case where two components are present. These two components can be mixed with a third component so that this third component amounts to up to 50% of the total weight.

The combination of active agents has a low toxicity towards warm-blooded creatures and a low phytotoxicity and develops a good activity during the control of fungus diseases in rice cultivation. The combination is for instance active against *Piricularia oryzae, Cochliobolus miyabeanus* and *Corticium sasakii.*

The combinations according to the invention may be applied by themselves or in the form of the usual compositions, such as emulsifiable concentrates, spray powders, pastes, soluble powders, dusting agents and granulates. These are prepared in known manner (cf. Agricultural Chemicals, March 1960, pages 35–38). The following may be mainly considered for use as assistants for this purpose: solvents such as aromatic hydrocarbons (for instance xylene), chlorinated aromatic hydrocarbons (for instance chlorobenzenes), paraffins (for instance petroleum fractions), alcohols (for instance methanol), amines (for instance ethanolamine) and water; carriers such as natural ground minerals (for instance kaolines, chalk) and synthetic ground minerals (for instance highly dispersed silicic acid); emulsifying agents such as non-ionic and anionic emulsifying agents (for instance polyethylene oxide esters of fatty acids, alkyl sulphonates); and dispersing agents such as lignin.

The active agents according to the invention may be present in the compositions in the form of mixtures with other known active agents.

In general, the compositions contain between 0.1 and 95 percent by weight of the active agent, and preferably between 0.5 and 90 percent by weight.

The combinations of active agents or their compositions are applied by the normal methods, for instance by spraying, sprinkling or dusting.

The following example is given for the purpose of illustrating the invention.

*Example*

Field test with *Piricularia oryzae* on water rice (*Oryza sativa japonica*), Type Norin 21.

The active agents are applied in the form of their aqueous suspensions. When mixtures of active agents are employed, aqueous suspensions of the individual active agents are first prepared separately. The suspensions are subsequently mixed. The preparation of the suspensions is carried out by the normal method with the use of an emulsifying agent.

Water rice is planted on plots each of an area of 35 square metres. The plots are subjected to natural infection. The first treatment is carried out 14 days after planting, by sprinkling the plants with the suspension of the active agents. It is applied at the rate of 1,200 litres per hectare. A second treatment is carried out 14 days after the first treatment, by the same method. The evaluation is effected four weeks after the second treatment, 200 leaves from each plot being employed for an estimation of the degree of infestation. The "degree of infestation" expresses the infestation of the plants on the experimental plot as a percentage of maximum possible infestation. This situation is realized as soon as the leaves of the rice plants are completely infested, i.e. completely covered by dark infestation areas. No normal green surface of the leaves is left. If, for example, 200 leaves from treated plants as well as 200 leaves from untreated plants were evaluated, the infestation degree would be 39.0 provided 39.0% of the surface of the leaves is infested, i.e. covered by dark infestation areas. The infestation degree of the untreated control is 45.8 if 45.8% of the surface of the leaves are infested, i.e. covered by dark infestation areas. From this result, it is possible to calculate the degree of activity, which specifies the percentage reduction of infestation compared with the untreated plot. The "degree of activity" may vary between 0 and 100, where 0 indicates that the infestation was just as high as for the untreated control and 100 indicates that an infestation has been prevented altogether.

The degree of activity, would, for example, be 15 if the degree of infestation of the untreated control plants is 45.8 and the degree of infestation of the treated plants is 39.0; in other words, if the percentage of the reduction of the infestation degree of the treated plants is 15 as compared with the untreated control plants. The difference between 45.8 and 39.0 is 6.8, i.e. 15% of 45.8.

The following table specifies the active agents, the contents of the active agents in the suspensions of the active agents as well as the degree of infestation and the degree of activity. The stated data represent average readings from three repeated determinations.

It is evident from the table that zinc 1,2-propylene-bis-dithiocarbamate only has a very low degree of activity (15) at a 0.05% concentration of the active agent and an extremely weak degree of activity (2) at a 0.025% concentration of the active agent.

On its own, Blasticidin S has a distinctly obvious degree of activity (42) at a 0.002% concentration of the active agent, but only a low degree of activity (21) at a 0.001% concentration of the active agent.

The activity of both products is nevertheless too low. This even applies when they are employed at a higher concentration.

When use is made of a mixture according to the invention, which for instance contains 0.025% of zinc propylene-bis-dithiocarbamate and 0.001% of Blasticidin S, the degree of activity is distinctly higher than that to be expected from a mixture of this type. Thus, the degree of activity is for instance 73, whereas at the same concentration of the active agent the degree of activity of zinc 1,2-propylene-bis-dithiocarbamate on its own would be 2 and at the same concentration of the active agent the degree of activity of Blasticidin S on its own would be 21. The degree of activity is a measure for the practical value of an active agent since it indicates both the protective and curative effects. The combinations of active agents according to the invention therefore exhibit a synergistic effect.

TABLE

| Active agents | Content of active agents as percent | Degree of infestation as experimental plots | Degree of activity of the products |
|---|---|---|---|
| Zinc 1,2-propylene-bis-dithiocarbamate. | 0.05 | 39.0 | 15 |
|  | 0.025 | 44.9 | 2 |
| Nickel 1,2-propylene-bis-dithiocarbamate. | 0.05 | 38.1 | 17 |
|  | 0.025 | 46.2 | 0 |
| Manganese/zinc 1,2-propylene-bis-dithiocarbamate (1:1). | 0.05 | 39.4 | 14 |
|  | 0.025 | 44.9 | 2 |
| Blasticidin S [1] | 0.002 | 26.6 | 42 |
|  | 0.001 | 36.2 | 21 |
| Zinc 1,2-propylene-bis-dithiocarbamate plus Blasticidin S.[1] | 0.025 +0.001 | 12.4 | 73 |
| Nickel 1,2-propylene-bis-dithiocarbamate plus Blasticidin S.[1] | 0.025 +0.001 | 9.6 | 79 |
| Manganese/zinc 1,2-propylene-bis-dithiocarbamate (1:1) plus Blasticidin S.[1] | 0.025 +0.001 | 11.5 | 75 |
| Untreated control | | 45.8 | 0 |

[1] Blasticidin S in terms of its hydrochloride (corresponding to 880 units).

We claim:
1. A fungal composition containing as active ingredients (1) about .001% by weight of Blasticidin S and (2) about .025% by weight of zinc-1,2-propylene-bis-dithiocarbamate salt.

2. A fungal composition containing as active ingredients (1) about .001% by weight of Blasticidin S and (2) about .025% by weight of nickel 1,2-propylene-bis dithiocarbamate salt.

3. A fungal composition containing as active ingredients (1) about .001% by weight of Blasticidin S and (2) about .025% by weight of mixed zinc/manganese-1,2-propylene-bis-dithiocarbamate salt.

References Cited by the Examiner

FOREIGN PATENTS 1,157,027  11/1963  Germany.

OTHER REFERENCES

Chemical Abstracts 57, 7671c (1962).
Chemical Abstracts Subject Index J–Z, volume 53, 1959, p. 1705s.
Chemical Week, Pesticides CW Report, June 1, 1963, p. 58.

JULIAN S. LEVITT, *Primary Examiner.*

J. D. GOLDBERG, *Assistant Examiner.*